United States Patent [19]

Schell

[11] Patent Number: 4,763,171
[45] Date of Patent: Aug. 9, 1988

[54] TRI-ROLL SCANNING ARRANGEMENT
[75] Inventor: Richard P. Schell, Webster, N.Y.
[73] Assignee: Xerox Corporation, Stamford, Conn.
[21] Appl. No.: 76,822
[22] Filed: Jul. 23, 1987
[51] Int. Cl.$^4$ .................. G03B 27/48; G03B 27/50; G03G 15/28; G03G 15/32
[52] U.S. Cl. .......................... 355/50; 355/8; 74/209
[58] Field of Search ............... 355/8, 50; 74/206, 209, 74/214, 216

[56] References Cited
U.S. PATENT DOCUMENTS

| | | | |
|---|---|---|---|
| 1,093,922 | 4/1914 | Dieterich | 74/206 |
| 1,289,818 | 12/1918 | Kurkjian | 74/209 |
| 2,577,190 | 12/1951 | Hare | 318/70 |
| 2,748,615 | 6/1956 | Nistri | 74/209 |
| 2,772,573 | 12/1956 | Thomas | 74/206 |
| 4,346,984 | 8/1982 | Kingsley | 355/8 |
| 4,444,069 | 4/1984 | Dangschat | 74/209 |

FOREIGN PATENT DOCUMENTS
150447 9/1920 United Kingdom .

Primary Examiner—Monroe H. Hayes
Attorney, Agent, or Firm—Mark Costello

[57] ABSTRACT

A scanning arrangement for supporting a device for scanning movement across a field, having a carriage supported for scanning movement through two parallel and co-planar U-shaped channels, each channel having upper and lower bearing surfaces, and an open side facing the opposite channel. The carriage is supported on a tri-roll bearing, including a rigid driver roll drivingly coupled to the axle member and in driving engagement with one of the bearing surfaces, and two rigid idler rollers, each in driven engagement with the driver roll and the other bearing surface, and maintained in non-contacting relationship, while provided with a spring force biasing the idler rolls toward one another.

10 Claims, 2 Drawing Sheets

TRI-ROLL SCANNING ARRANGEMENT

The present invention relates generally to scanning arrangements and more particularly to a bearing arrangement supporting a carriage assembly for positive driving motion.

BACKGROUND OF THE INVENTION

As electronic scanning becomes more useful for acquiring image information from documents in terms of speed of data acquisition and number of data points collected, a concurrent development of mechanical elements to take advantage of the electronic improvements has become necessary. Electronic scanning devices of the type contemplated usually provide a linear array of photosensitive elements arranged in a row, parallel to a document to be scanned and trasverse to the direction of relative motion of the document and the array. Because the photosensitive elements represent small areas of the document and relatively small movements will vary the image detected by the photosensitive elements, the image quality obtained in electronic scanning of documents is highly motion sensitive. Accordingly, movements of the scanning carriage must be free from vibrations caused by scanning movement, speed variations, or slippage during acceleration. However, the higher sample resolutions in data acquisition, or correspondingly smaller sample size desirable with the use of the electronic scanning devices, results in a corresponding increase in motion quality problems.

In the past, a large variety of scanning arrangements have been provided for the optical scanning systems in reproduction machines such as xerographic devices, where a portion of the optics systems, such as, for example, mirrors for reflecting light from a document to a photoreceptor, are supported on parallel rails and driven by a lead screw or pulley drive system. The support arrangement generally used provides low friction bearing members, often with a shape conforming to the rails, supporting the weight of the scanning member on the rails, and biased against the rail to maintain contact with a spring bias force applied, for example by a spring-loaded roll or wheel arranged on the opposing side of the rail from the bearing member. An alternative arrangement might provide a supporting carriage slidably supported on parallel rods, such as that shown by U.S. Pat. No. 4,346,984 to Kingsley, incorporated herein by reference, and driven by a lead screw drive arrangement connected to the carriage member. Heretofore, as shown in the Kingsley patent, scanning arrays have been commonly supported on a fixed surface, with the scanning optical arrangements used for directing light reflected from a document to the array. However, in devices such as that taught in U.S. patent application Ser. No. 943,280 filed Dec. 18, 1986, incorporated herein by reference, a scanning array is supported on a carriage for scanning movement across a platen.

Tri-roll drive arrangements are known in transmission systems as part of vibration-free drive apparatus for providing a driving force for movement of an element. In such arrangements, a driven roll is arranged in frictional driving contact with two adjacent, but non-abutting roll members biased tgether with a spring force, with either the driven roll or the idler rolls in frictional driving contact with the element to which motion is to be imparted. The resulting arrangement is substantially vibration free, without any slippage on start-up. Thus, as shown in U.S. Pat. Nos. 4,444,069 to Dangschat, 2,748,615 to Nistri, 2,577,190 to Hare, and British Pat. No. 150,447 to Estrade, elements may be driven in a uniform and vibration free manner by providing a transmission system wherein motion of a rotating shaft or pulley is transmitted to a driven member through a tri-roll drive arrangement.

SUMMARY OF THE INVENTION

In accordance with the invention, a scanning arrangement is provided for supporting a device for scanning movement across a field, including a carriage supported on at least a first axle member for carrying a scanning element. The axle member is supported for scanning movement between two parallel U-shaped channel members, having open sides in opposed relationship, and upper and lower bearing surfaces each adjacent the open side. Each end of the axle member is supported in the channel member on a tri-roll scanning bearing including a first driver roll drivingly coupled to the axle member and in driving engagement with one of the bearing surfaces; first and second idler rolls, each in driven engagement with the driver roll and the other of the bearing surfaces, maintained in non-contacting relationship, while provided with a spring force biasing the idler rolls toward one another.

In accordance with another aspect of the invention, a driving force may be applied to the scanning arrangement with either a direct drive motor engaged with the axle member for driving rotation of the axle and accordingly the drive roll, or with a lead screw drive arrangement which may be arranged to apply a driving force to the carriage for scanning movement thereof.

In the described arrangement, the geometry of the device provides a force multiplier which converts the spring force between the idler rolls into a greater driving friction for the device. Increased driving friction serves to create a positive traction system which, even though based on frictional engagement of the rollers and the bearing surfaces, provides a low slippage bearing, without backlash. Accordingly, on startup acceleration and during driving, the bearing arrangement provides a smooth translation of motion. Further, and depending upon which direction the arrangement is being driven, the lagging idler roll with respect to the directio of movement, is constantly being wedged between the driver roll and the bearing surface against which the idler is in abutment. This wedging action further increases the high driving force on the rolls against the bearing surfaces. The distributed force of the tri-roll bearing on the upper and lower bearing surface provides a high driving friction arrangement for a smooth driving device particularly suited for electronic scanning apparatus.

These and other aspects of the invention will become apparent from the following description used to illustrate a preferred embodiment of the invention read in conjunction with the accompanying drawings in which.

Figure 1:
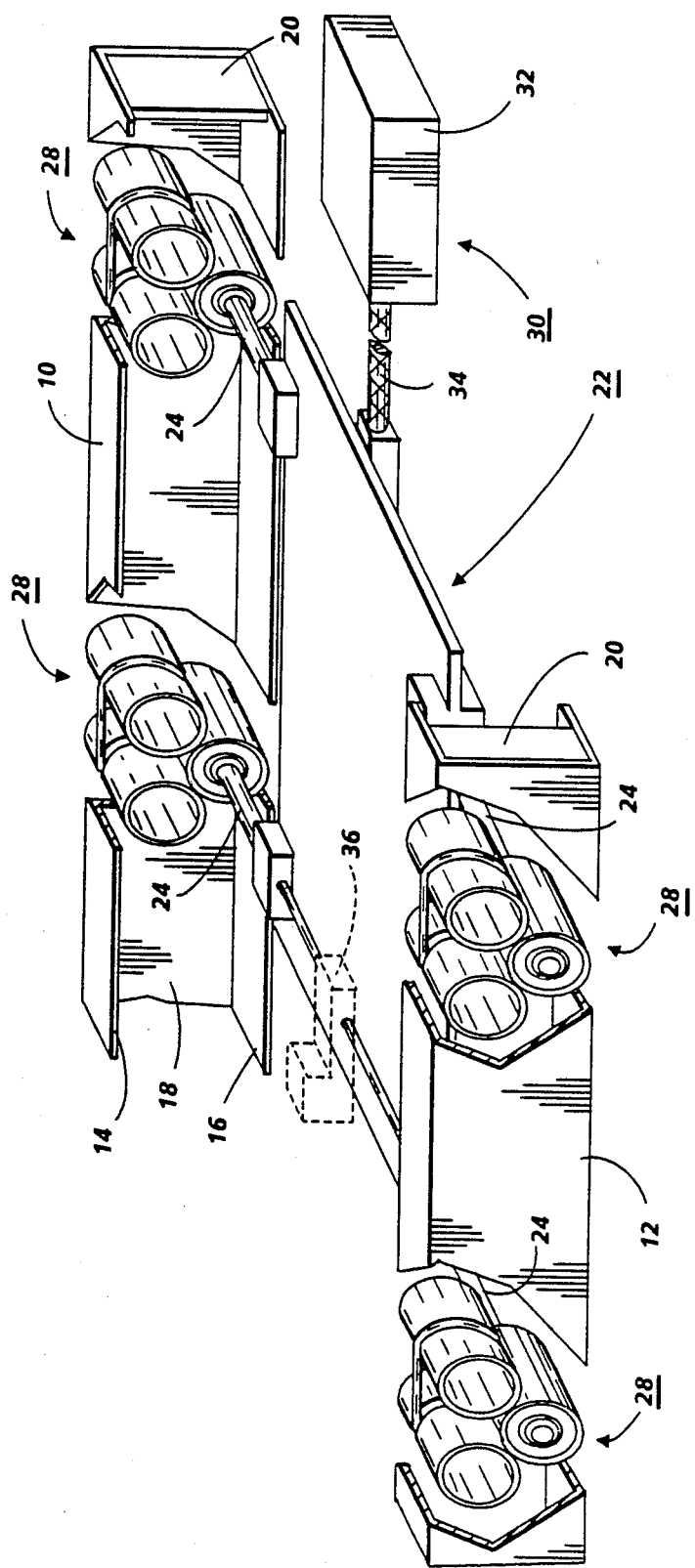
FIG. 1 is a perspective view of a scanning arrangement for use in a variety of applications, and particularly for supporting a photosensitive element array.

Referring now to the drawings where the showings are for the purpose of describing a preferred embodiment of the invention and not for the purpose of limiting same, FIG. 1 shows a scanning arrangement in accordance with the invention, adaptable for support of a linear array of photosensitive elements for scanning an original document. It is contemplated that for this embodiment such a photosensitive element array will constitute a full length array, conforming to the size of the original document to be scanned. A fiber optic lens array comprising an array of gradient index fiber elements to optically transmit light reflected from a line-like portion of the document being scanned may be interposed between the array and the document, and also carried on the scanning arrangement. An illuminating lamp may also be provided. Alternatively the scanning carriage may support other optical combinations, such as for example, a mirror and lamp, for directing light from an illuminated document to a photoreceptor surface.

In accordance with FIG. 1, a parallel pair of U-shaped channels 10 and 12 are arranged with open sides facing each other, each provided with parallel upper and lower channel or bearing surfaces 14 and 16, connected by a side channel surface 18. The channels in the described embodiment may be a variety of materials, such as a rigid single piece steel or aluminum construction. End enclosures 20 may be provided at each end of the channels to provide endpoints for travel through the channels. It will, of course, be appreciated that other channel configurations, such as parallel cylindrical rods, are well within the scope of the invention, which provide parallel upper and lower bearing surfaces. In a preferred embodiment of the invention, the channel members are an extruded single piece construction, without significant machining involved in fabrication. Other materials providing satisfactory rigidity may be used so long as the channel upper and lower bearing surfaces do not deflect under the high separation forces experienced therebetween.

Carriage 22 may be a variety of shapes and sizes as necessary to support an element for scanning (back and forth) movement parallel to channels 10 and 12 thereinbetween, on carriage axles 24 and 26 journaled through openings on the carriage (not shown). As used herein, the term "axle" refers to the arrangement for supporting the carriage for movement between the channels. Each end of the carriage axles extends into one of parallel channels 10 and 12, and is supported for movement through the channels on tri-roll drive element 28. A lead screw drive arrangement 30 may advantageously be coupled to carriage 22 to drive the carriage in scanning movement. Lead screw motor 32 rotates the lead screw 34 to drive carriage 22. Alternatively, a driving motor 36 (shown in phantom) may be mounted on the carriage with a direct driving connection to axle member 24. Motor 32 may be controllable by a system controller (not shown) in accordance with a predetermined pattern of motion which may include stopping, starting, constant speed, acceleration or deceleration, etc. While the described embodiment demonstrates a pair of axles supported on tri-roll bearing elements, there may well be provided only a single axle thus supported, with the remaining axle supported on another type of bearing, or idler roll arrangement. Alternatively, it may be possible to support the carriage only on a single axle. Axle members 24 and 26 may also take a variety of shapes and forms other than the cylindrical rods depicted in the embodiment. Accordingly, integral extensions of the carriage might be shaped to form a cylindrical bearing surface for connection of the carriage to the driver rolls. Other driving arrangements, including pulley arrangements are also well within the contemplation of the invention.

Figure 2:
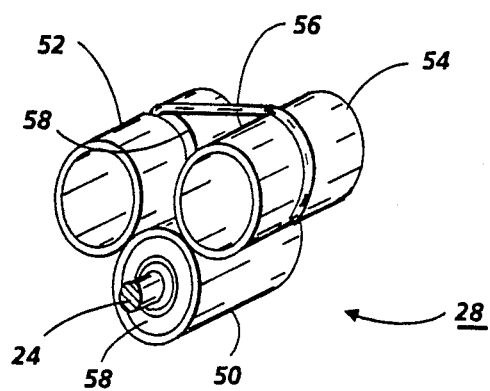
FIG. 2 is a perspective view of a tri-roll bearing element for use in the inventive scanning arrangement.

With reference now to FIGS. 1 and 2, tri-roll drive element 28 includes driver roll 50 and idler rolls 52 and 54. In the described embodiment, drive roll 50 is in driving frictional engagement with lower bearing surface 16, and idler rolls 52 and 54. Idler rolls 52 and 54 are each in frictional rolling abutment with upper channel surface 14. Idler rolls 52 and 54 are held in spaced apart relationship by the positioning of the idler rolls with respect to drive roll 50, and the separation between channel surfaces 14 and 16, but are biased together with a spring force, in this case supplied by resilient O-ring 56 surrounding and connecting the two idler rolls, and seated in a circumferential slot 58 on the exterior surface of each idler roll, slot 56 having a depth so that it supports the O-ring without effect on the rolling friction of the system, and does not abut with the drive roll. In the described embodiment, wherein the carriage is drivingly coupled to lead screw drive arrangement 30, driver roll 50 is connected to axle member 24 through a bearing race 58 which allows the free rotation of the driver roll with respect to the axle member. However, it is well within with the contemplation of the invention, in an embodiment such as that using a motor 36 drivingly connected to the axle, to provide a fixed connection between the axle 24 and the driver roll 50 such that rotation of the axle also rotates the driver roll. Idler rolls 52 and 54 may advantageously be formed with hollow cylinder members, having the same outer diameters, the thickness of the cylinder wall selected for giving enough strength to maintain the cylinders in a rigid state. The rolls may be formed in a number of ways which allow precision formation of the rolls to close tolerance specifications of roundness, and in the described embodiment are formed from machined steel. Non-compliant rigid rolls are desirable because soft rolls have a tendency to deform on start-ups and stops, causing backlash, and movement non-uniformity. It is, however, well within the contemplation of the invention to form the rolls from a plastic material which offers the desired characteristics of rigidness and formability. A variety of other arrangements for biasing the rolls together are possible, depending at least partially on the rolls construction. The idler rolls could, for example, each be mounted on a bearing race about a pivot member, the pivot members of each idler roll biased together with a wire spring member, or other spring force generating arrangement.

In an operative embodiment of the defined scanning arrangement, which incorporated a motor supported on a carriage driving an axle for motive force, the driver roll 50 and idler rolls 52 and 54 were all made of 1 inch outer diameter steel rolls. The channels 10 and 12 were fabricated from a steel member having flat, parallel upper and lower bearing surfaces 14 and 16 separated about 1.835 inches, so that a idler roll separation of 0.1 inches can be used. The channel members were extremely rigid to avoid deformation due to the force of the rollers on the bearing surfaces, as will be described herein below.

Figure 3:
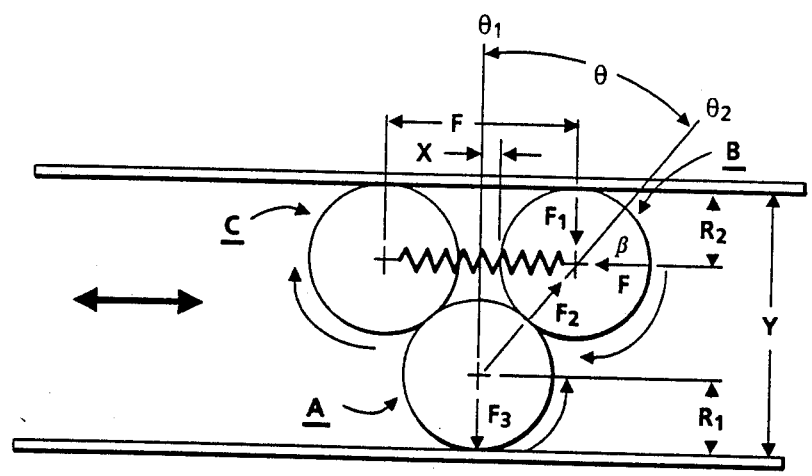
FIG. 3 is a schematically represented side view of the tri-roll bearing of FIG. 2.

With reference now to FIG. 3, the wedging angle $\theta$, herein defined as the angle formed by imaginary lines $\theta_1$ through the center of the drive roll, and extending perpendicularly to the channel bearing surfaces, and $\theta_2$, through the center of both the driver roll and one of the idler rolls is about 33.37°. The wedging angle is determined by the size of the rolls used, the distance between the upper and lower bearing surfaces, and the spacing between the idler rolls. In the described embodiment, with 1 inch rollers, (designated $R_1$ for the driver radius and $R_2$ for the idler radius) a separation X of 0.1 inches, and a bearing surface separation Y of 1.835 inches, and a measured spring force applied between the two idlers of 1.2 lbs a force multiplying effect is seen. Considering the forces on the idler roll labeled B, which include the spring force F, in a direction parallel to motion of the arrangement a normal force $F_1$ from the upper bearing rails exerted on the idler roll, and a force $F_2$ exerted on the idler roll by the roller A, it can be shown that $$F_2 = F/\sin\theta = 2.182 \text{ lbs}$$

$$F_1 = F/\tan\theta = 1.822 \text{ lbs}$$

$F_1$ is the same value for both idler rolls. Looking at the $F_3$, the downwardly directed force on the lower driving roll A, produced by the spring force F.

$$F_3 = F_{1B} + F_{1C} = 3.644 \text{ lbs}$$

Thus it can be seen that the driving force is a function of the spring force applied. It may also be seen that because the size (radius $R_2$) of the idler rollers will vary the angle $\theta$, selection of the size of the idler rollers will vary the driving force, since $F_3$ can also be written $$F_3 = 2 F/\tan\theta$$

As the size of rollers decreases, angle $\theta$ decreases, and accordingly, with tan$\theta$ decreasing, $F_3$ becomes larger accordingly. Of course, to accomodate the change in size, driver roll A may increase in size or the separation between the rails may decrease. If the idler rolls are not the same diameter, the driving forces could be changes for motion in one direction over the other.

In addition to the driving force produced as a result of the spring force, another action appears to dynamically increase the driving force of the system. Once in motion, the lagging roller has the continuous tendency to wedge itself between the rail and the driving roller. This tendency, which also appears to increase in accordance with the decreased size of the wedging angle, further increases the driving force of the system.

The invention has been described with reference to a preferred embodiment. Obviously modifications will occur to others upon reading and understanding the specification taken together with the drawings. It will not doubt be particularly appreciated that the many elements comprising the paper handling aspects of the present invention have applications beyond the described embodiment. This embodiment is but one example, and various alternatives modifications, variations or improvements may be made by those skilled in the art from this teaching which are intended to be encompassed by the following claims.

What is claimed is:

1. A scanning arrangement for supporting a device for scanning movement across a field, said arrangement comprising:
    a carriage for supporting a device for scanning;
    said carriage supported on at least one axle member;
    said axle member supported for scanning movement through two parallel and co-planar U-shaped channel members, each channel having upper and lower bearing surfaces, and an open side facing the opposite channel;
    each end of said axle member supported in one of said channel member on a tri-roll bearing, said bearing including a rigid driver roll drivingly coupled to said axle member and in driving engagement with one of said bearing surfaces, and first and second rigid idler rollers, each in driven engagement with said driver roll and the other of said bearing surfaces, and maintained in non-contacting relationship, while provided with a spring force biasing said idler rolls toward one another; and
    means for driving said carriage in scanning movement 2. The arrangement as defined in claim 1 wherein said means for driving said carriage in scanning movement includes a motor drivingly engaged to said axle member.

3. A scanning arrangement for supporting a device for scanning movement across a field, said arrangement comprising:
    a support carriage for supporting a device for scanning;
    said carriage supported on at least a first axle member;
    said axle member supported for scanning movement through two parallel and co-planar U-shaped channel members, each channel having upper and lower bearing surfaces, and an open side facing the opposite channel;
    each end of said axle member supported in said channel member on a tri-roll scanning drive, said bearing including a first roll in driving engagement with one of said bearing surfaces, and second and third rollers, each in driven engagement with said first roll and the other of said bearing surfaces, and maintained in non-contacting relationship, while provided with a spring force biasing said second and third rolls toward one another; and
    means for driving said carriage in scanning movement.

4. The arrangement as defined in claim 3 wherein said means for driving said carriage in scanning movement includes a motor and lead screw drive arrangement drivingly engaged to said carriage.

5. A bearing arrangement for supporting a device for movement along a scanning path defined by parallel bearing surfaces, said bearing comprising:
    a substantially rigid drive roll, in driving contact with a first bearing surface; and
    a pair of substantially rigid idler rolls, held in driving engagement between said drive roll and a second bearing surface, said idler rolls connected with an O-ring seated in a slot formed in the idler rolls, and arranged to maintain a clearance thereinbetween.

6. A scanning arrangement for supporting a scanning device for scanning movement across a field, said arrangement comprising:
    a carriage for supporting a device for scanning;
    said carriage supported on a pair of axle members, journaled through the carriage;
    said axle members supported for scanning movement through two parallel and co-planar rigid U-shaped channel members, each channel having upper and lower parallel bearing surfaces, and an open side facing the other channel;
    each end of said axle members supported in one of said channel members through the open side on a tri-roll bearing, said bearing including a rigid driver roll drivingly coupled to said axle member and in driving engagement with one of said bearing surfaces, and first and second rigid idler rollers, each in driven engagement with said driver roll and the other of said bearing surfaces, and maintained in non-contacting relationship, while provided with a spring force biasing said idler rolls toward one another; and means for driving said carriage in scanning movement.

7. the scanning arrangement as defined in claim 6, wherein said idler rolls comprise hollow cylinders having an identical outer diameter, with a cylinder wall thickness selected to maintain cylindrical rigidity.

8. The scanning arrangement as defined in claim 6, wherein said pair of substantially rigid idler rolls, are connected with an resilient O-ring seated in a slot formed in the idler rolls, and arranged to maintain a clearance thereinbetween.

9. The scanning arrangement as defined in claim 8, wherein said slot in said idler rolls has a depth selected to support said O-ring in non-contacting relationship with said driver roll.

10. The scanning arrangement as defined in claim 6, wherein said idler rolls have a diameter less than said driver roll to increase the driving friction of the arrangement.

* * * * *